United States Patent Office 2,701,797
Patented Feb. 8, 1955

2,701,797

1(3 - INDOLYLMETHYL) - PIPERIDINE - N,N-DIALKYLCARBOXAMIDE COMPOUNDS AND METHOD OF MAKING THE SAME

Ansel P. Swain, Springfield Township, Montgomery County, Pa., assignor to McNeil Laboratories, Inc., Philadelphia, Pa., a corporation of Pennsylvania No Drawing. Application September 2, 1953,
Serial No. 378,161

10 Claims. (Cl. 260—294)

The present invention relates to novel chemical compounds possessing valuable therapeutic properties and to the method of making the same; and, more particularly, it relates to novel 1(3-indolylmethyl)-piperidine-N,N-dialkylcarboxamide compounds possessing marked hypotensive properties.

Many agents are known to produce a lowering of blood pressure in a living body. Unfortunately, these substances possess such limitations and disadvantages as to render them practically unusable as specific therapeutic agents in the treatment and relief of hypertension. Thus, in many cases the hypotensive effect of these agents is only transitory, while others produce undesirable side effects on the system even at levels that are only partially effective. Many of the agents cannot be administered orally since they have an irritating or corrosive effect on the stomach or intestinal wall, and even when administered parenterally, three results as far as relief from hypertension is concerned, are erratic.

It is the principal object of the present invention to provide new chemical compounds that possess valuable hypotensive properties and which do not produce undesirable side effects on the system when administered in therapeutic dosages.

Another object is to provide new chemical compounds having the described properties which may be administered orally as well as parenterally.

Further objects, including the provision of a method of making the novel compounds, will become apparent from a consideration of the following specification and claims.

The novel chemical compounds of the present invention are 1-(3-indolylmethyl)-piperidine-N,N-dialkylcarboxamide compounds having the fundamental structural formula

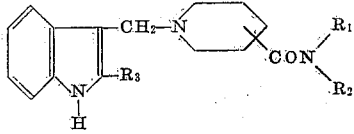

where $R_1$ and $R_2$ are alkyl groups containing from 1 to 4 carbon atoms, and where $R_3$ is selected from the group consisting of hydrogen and alkyl groups containing from 1 to 4 carbon atoms.

The compounds of the invention possess marked hypotensive activity and the ability to inhibit cardiovascular reflexes that tend to elevate blood pressure. This combination of properties is useful in the treatment of hypertension and related diseases. In addition the compounds are orally active, and, when administered orally in the level required for the desired hypotensive effect, do not produce symptoms of gastric distress. In accordance with the broader aspects of the invention, the dialkyl amide group, in the compounds, may be located in the 2, 3 or 4 position of the piperidine nucleus. Pharmacological investigation indicates, however, that the 4-substituted compounds may act hypotensively by a mechanism different from that of the 2- or 3-substituted compounds. The 4-substituted compounds are outstanding in that they resemble ergot insofar as its desirable cardiovascular actions are concerned. On this basis, the 4-substituted compounds are presently preferred. The 2- and 3-substituted compounds are outstanding in that they resemble protoveratrine in some of its desirable cardiovascular actions. As between the 2- and 3-substituted compounds, the 3-substituted compounds are presently preferred.

The chemical names of the compounds will vary depending upon the location of the dialkyl amide group. Thus, those compounds in which the dialkyl amide group is located at the 4 position will be referred to as isonipecotamide compounds; those in which the dialkyl amide group is located in the 3 position as nipecotamide compounds, and those in which the dialkyl amide group is located in the 2 position as pipecolamide compounds.

In the compounds, as stated, the $R_1$ and $R_2$ groups are alkyl groups containing from 1 to 4 carbon atoms, such as methyl, ethyl, n-propyl, isopropyl, allyl, n-butyl, sec-butyl and tert-butyl. In any one compound $R_1$ and $R_2$ may be the same radicals or different. Usually they will be the same. In the preferred compounds, $R_1$ and $R_2$ are alkyl groups containing 2 or 3 carbon atoms. $R_3$ may be, in addition to an alkyl group containing 1 to 4 carbon atoms, such as those mentioned above in connection with $R_1$ and $R_2$, hydrogen. In the preferred compounds $R_3$ is either hydrogen or a methyl group, particularly hydrogen.

In the compounds of the invention a mol equivalent of an acid may be added to the nitrogen of the piperidine ring to provide the compound in the form of an addition salt. Hence the compounds may be prepared and/or employed either as the base or as a salt. In view of the fact that structurally the salts differ from the bases only in the addition of an acid to the stated nitrogen atom and comprise the same fundamental structural formula, the salts as well as the bases are included within the scope of this application and of the claims where reference is made to compounds comprising the stated fundamental structure.

The acid forming the salt may be any inorganic or organic acid desired, for example, hydrochloric, hydrobromic, hydriodic, nitric, sulphuric, phosphoric, and the like; acetic, propionic, caproic, stearic, and other acids of this series, and the like; crotonic, fumaric, oleic, oxalic, citric, tartaric, lactic, benzoic, naphthoic, picric, salicylic, dilituric, methane sulphonic, camphor sulphonic, and the like. If a salt is to be administered, any toxicity or other undesirable effects which may be imparted by the acid should be taken into consideration as well known in the art.

The compounds of the invention may be prepared by reacting one mol of N,N-dialkyl piperidine carboxamide base, hydrate or salt with one mol of indole, or alkyl substituted indole, and one mol of formaldehyde. The reaction will generally be conducted in water or an organic solvent, such as methanol, or in a mixture of both such as aqueous methanol. The reaction proceeds satisfactorily at room temperature, and the reaction mixture may merely be permitted to stand at room temperature for from several hours to a few days until the reaction is complete. It may be desirable to permit the reaction to proceed in the dark to avoid any slight decomposition of the indole which appears to be hastened in the presence of strong light. Where an N,N-dialkyl piperidine carboxamide salt is employed, the resulting product may be isolated as the corresponding salt. Where the N,N-dialkyl piperidine carboxamide base or hydrate is employed and it is desired to recover the product as a salt, an acid may be added to the reaction mixture. The salt form of the product is most readily isolated in crystalline form. The product may be recovered from the reaction medium by evaporation of the solvent under vacuum or by precipitation by the addition of a material, e. g. ether, in which it is insoluble. The recovered product may be purified following well known techniques, such as by recrystallization from a methanol-ether mixture.

The N,N-dialkyl piperidine carboxamide compound employed in the reaction described above may be prepared by reducing the corresponding N,N-dialkyl-pyridine carboxamide with hydrogen in the presence of a nickel or platinum catalyst. When nickel is used, the reduction will be carried out in an inert solvent such as dioxane, cyclohexane, and the like. When platinum is used, from one to one and one-half equivalents of a strong acid, such as hydrochloric acid, is added to the reaction mixture, or a salt of the N,N-dialkylpyridine carboxamide may be used. The solvent may conveniently be methanol, ethanol, or water.

The compounds of the present invention and their preparation will be more clearly understood from a consideration of the following specific examples which are given for the purpose of illustration only and are not to be construed as limiting the scope of the invention in any way.

Example I 50 grams of N,N-diethylnicotinamide in 50 ml. of water containing 34.5 ml. of concentrated hydrochloric acid are reduced with hydrogen in the presence of platinum oxide catalyst. After removal of the catalyst and solvent there remains a clear glass that slowly crystallizes on standing in a desiccator over $P_2O_5$.

6.6 g. (.03 mol) of the resulting N,N-diethylnipecotamide hydrochloride, 3.5 g. (.03 mol) of indole and 2.3 ml. of 37% aqueous formaldehyde (.03 mol) are added to 25 ml. of water, and the mixture allowed to stand at room temperature for two days. Several crystallizations from a methanol-ether mixture yields 4.3 g. of 1-(3-indolylmethyl)-N,N-diethylnipecotamide hydrochloride melting at 188–189° C. The calculated N and Cl contents for $C_{19}H_{28}ClN_3O$ is N, 12.0%; Cl, 10.1%; those found were N, 12.1%; Cl, 10.2%.

Only 10 mg./kilogram of body weight of the compound lowers the blood pressure for a substantially long time.

Following the same procedure the corresponding dimethyl compound may be prepared by using dimethylnipecotamide hydrochloride in place of diethylnipecotamide hydrochloride.

Example II

An aqueous solution of diethylisonicotinamide hydrochloride is reduced with hydrogen in the presence of platinum oxide catalyst to produce 5.9 g. of diethylisonipecotamide hydrochloride melting at 261° C.

3.9 g. of diethylisonipecotamide hydrochloride, 2.1 g. of indole and 1.5 g. of 37% aqueous formaldehyde are mixed together in 20 ml. of 50% aqueous methanol, and the mixture is allowed to stand at room temperature for two days. After two recrystallizations from a methanol-ether mixture, there results 4.3 g. of 1-(3-indolylmethyl) - N,N - diethylisonipecotamide hydrochloride decomposing, upon heating, at 170–172° C. The calculated N and Cl contents for $C_{19}H_{28}ClN_3O$ are N, 12.0%; Cl, 10.1%; those found were N, 11.9%; Cl, 9.8%.

Only 6 mg./kilogram of body weight of the compound reduces the blood pressure substantially for a moderate length of time.

The corresponding dimethyl compound may be prepared by following the same procedure but substituting dimethylisonipecotamide hydrochloride for the diethylisonipecotamide hydrochloride.

Example III

N,N-diisopropylnicotinamide hydrate is reduced using Raney nickel catalyst to provide N,N-diisopropylnipecotamide hydrate.

A mixture of 5 g. (.022 mol) of N,N-diisopropylnipecotamide hydrate, 2.6 g. (.022 mol) of indole and 1.7 ml. (.022 mol) of 37% formalin in 10 ml. of methanol is allowed to stand at room temperature overnight. The solvent is removed by distillation in a vacuum. The solid product is dissolved in ether and filtered to remove a trace of ether-insoluble matter, and the filtrate is treated with a solution of anhydrous hydrogen chloride in ether. The resulting precipitate is separated by filtration and recrystallized from methanol and ether to give 2 g. of 1-(3-indolylmethyl)-N,N-diisopropylnipecotamide hydrochloride melting at 177–179° C. The calculated N content for $C_{21}H_{32}ClN_3O$ is 11.1%; that found was 11.1%.

About 16 mg. per kilogram of body weight of the compound reduces the blood pressure significantly.

The corresponding diallyl and dibutyl compounds may be prepared by substituting diallyl- or dibutylnipecotamide or the hydrate thereof for the diisopropylnipecotamide hydrate in the foregoing procedure.

Example IV

A mixture of 2.0 g. (.008 mol) of N,N-diisopropylisonipecotamide hydrochloride, 0.9 g. (.008 mol) of indole and .24 g. (.008 mol, 0.6 cc. of 37% formalin) formaldehyde in methanol is allowed to stand at room temperature for two days. Evaporation of the solvent in vacuum and crystallization from a methanol-ether mixture gives 1.5 g. of 1-(3-indolylmethyl)-N,N-diisopropylisonipecotamide hydrochloride which, upon heating, begins to decompose at 217° C.

The calculated N content for $C_{21}H_{32}ClN_3O$ is 11.1%; that found was 11.2%.

Only 4 mg. of this compound per kilogram of body weight reduces the blood pressure substantially for a moderate length of time.

The corresponding diallyl- and dibutylisonipecotamide compounds may be prepared by substituting diallyl- or dibutylisonipecotamide hydrochloride for the diisopropylisonipecotamide hydrochloride in the foregoing procedure.

Example V

A mixture of 12.1 g. (.055 mol) of N,N-diethylisonipecotamide hydrochloride, 7.2 g. (.055 mol) of 2-methylindole and 4.5 g. (.055 mol) of 37% formaldehyde in 30 ml. of methanol is allowed to stand for four days at room temperature. After removal of the solvent under reduced pressure, the sticky residue is washed well with ether and scratched with anhydrous acetone until it solidifies. After several crystallizations from a methanol-ether mixture, there is obtained 4.2 g. of 1 - [3 - (2 - methyl)indolylmethyl] - N,N - diethylisonipecotamide hydrochloride which, upon heating, begins to decompose at 246.5–247.5° C.

The calculated N content for $C_{20}H_{30}ClN_3O$ is 11.6%; that found was 11.5%.

From 2 to 8 mg. of this compound per kilogram of body weight reduces the blood pressure substantially.

The corresponding ethyl-, propyl-, allyl-, and butylindole compounds may be prepared by substituting the appropriate alkyl-substituted indoles for the methyl indole of the example or for the indole of the other examples.

Example VI

N,N-diethylpicolinamide hydrochloride hydrate is reduced in methanol at 50–60 p. s. i. of hydrogen and room temperature with the use of platinum dioxide catalyst to produce N,N-diethylpipecolamide hydrochloride hydrate.

A solution of 10.3 g. (.043 mol) of N,N-diethylpipecolamide hydrochloride hydrate, 5.15 g. (.044 mol) of indole and 1.32 g. (.044 mol) of formaldehyde (3.35 ml. of 37% aqueous formaldehyde) in 30 ml. of methanol is allowed to stand at room temperature for 3 days. The orange solution is treated with ether, chilled and scratched to give 15.9 g. of a light yellow solid melting at 139–142° C. Four crystallizations from a methanol-ether mixture gives 8.4 g. of 1-(3-indolylmethyl)-N,N-diethylpipecolamide hydrochloride melting at 169–171° C.

The calculated N content for $C_{19}H_{28}ClN_3O$ is 12.0%; that found was 12.0%.

8 mg. of this compound per kilogram of body weight reduces the blood pressure substantially.

The corresponding dimethyl, dipropyl, diallyl and dibutyl compounds may be prepared by substituting the appropriate dialkylpipecolamide hydrochloride or hydrate thereof for the diethylpipecolamide hydrochloride hydrate of the foregoing procedure.

In preparing compounds in which the alkyl groups of the dialkylamide group differ from each other, the same procedures as set forth in the foregoing examples may be followed using, however, the appropriate piperidine N,N-dialkylcarboxamide reactants.

Some modification is possible in the selection of the various substituents and combinations thereof as well as in the particular procedure employed in preparing the compounds without departing from the scope of the invention.

I claim:

1. 1-(3-indolylmethyl) - piperidine-N,N-dialkylcarboxamide compounds having the fundamental structural formula

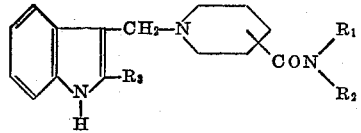

where $R_1$ and $R_2$ are alkyl groups containing from 1 to 4 carbon atoms and where $R_3$ is selected from the group consisting of hydrogen and alkyl groups containing from 1 to 4 carbon atoms.

2. 1-(3-indolylmethyl) - N,N - dialkylisonipecotamide compounds having the fundamental structural formula

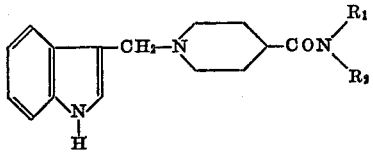

where $R_1$ and $R_2$ are alkyl groups containing from 1 to 4 carbon atoms.

3. A 1-(3-indolylmethyl)-N,N-diethylisonipecotamide compound having the fundamental structural formula

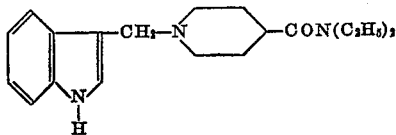

4. A 1-[3-(2-methyl)indolylmethyl] - N,N - diethylisonipecotamide compound having the fundamental structural formula

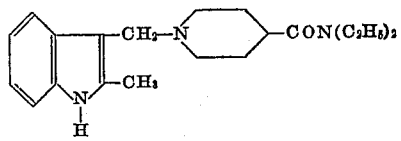

5. A 1-(3-indolylmethyl)-N,N-dipropylisonipecotamide compound having the fundamental structural formula

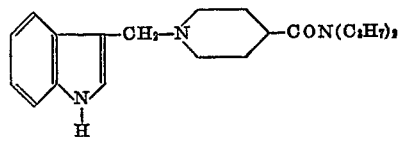

6. A 1 - (3 - indolylmethyl)N,N-diisopropylisonipecotamide compound having the fundamental structural formula

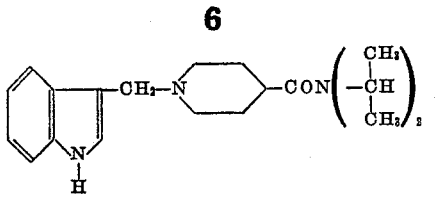

7. A 1-(3-indolylmethyl) - N,N - dialkylnipecotamide compound having the fundamental structural formula

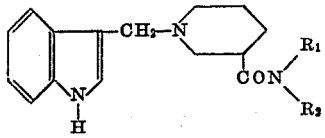

where $R_1$ and $R_2$ are alkyl groups containing from 1 to 4 carbon atoms.

8. A 1-(3-indolylmethyl) - N,N - diethylnipecotamide compound having the fundamental structural formula

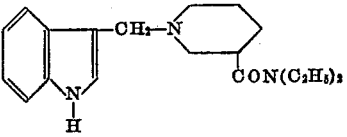

9. A 1-(3-indolylmethyl) - N,N - dipropylnipecotamide compound having the fundamental structural formula

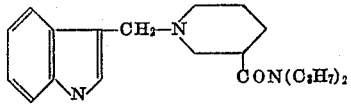

10. A 1-(3-indolylmethyl) - N,N - diisopropylnipecotamide compound having the fundamental structural formula

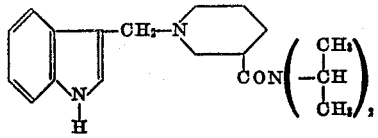

References Cited in the file of this patent

Jongh et al.: Jour. of Pharmacology and Experimental Therapeutics, 105:130–138 (1952).

Akkerman et al.: Recueil des Travaux Chimiques des Pays-Bas 70:899–916 (1951).